United States Patent

Mori et al.

[11] Patent Number: 5,866,817
[45] Date of Patent: Feb. 2, 1999

[54] ACCELERATION SENSOR

[75] Inventors: Masatomo Mori; Masahiro Nezu, both of Saitama; Rokurou Naya; Shougo Suzuki, both of Kanagawa, all of Japan

[73] Assignees: Akebono Brake Industry Co., Tokyo, Japan; Nihon Inter Electronics Corporation, Hadano, Japan

[21] Appl. No.: 686,202

[22] Filed: Jul. 25, 1996

[30] Foreign Application Priority Data

Jul. 26, 1995 [JP] Japan ................................. 7-190550

[51] Int. Cl.[6] ................................................. G01P 15/12
[52] U.S. Cl. ................................... 73/514.33; 73/514.38
[58] Field of Search ......................... 73/514.33, 514.36, 73/514.38; 338/2, 5

[56] References Cited

U.S. PATENT DOCUMENTS 4,969,359 11/1990 Mikkor .............................. 73/514.33
5,485,749 1/1996 Nohara et al. ........................ 338/2

*Primary Examiner*—John E. Chapman
*Attorney, Agent, or Firm*—Morgan, Lewis & Bockius LLP

[57] ABSTRACT

A small-sized, reliable, low-cost acceleration sensor includes a working mechanism having a large joint surface. In this respect, an acceleration sensor 1 is arranged so that a diaphragm portion 2D is formed on a (100) face of a plate of single crystal silicon. The four corner portions of the joint surface 2A of a square frame are expanded in the center direction of the plate of single crystal silicon so as to form expanded portions 2B. Moreover, the (100) face of the square plate of single crystal silicon is covered with a mask having at least an octagonal opening 10E before being subjected to anisotropic etching, so that the expanded portions 2B directed to the center portion are formed in the respective four corner portions of the plate of single crystal silicon.

9 Claims, 5 Drawing Sheets

ACCELERATION SENSOR

BACKGROUND OF THE INVENTION

1. Field of the Invention

The present invention relates to an acceleration sensor which uses resistance elements and to a method for producing such an acceleration sensor. More particularly, the present invention relates to an acceleration sensor for detecting mechanical deformation in terms of variations in electrical resistance introduced by resistance elements formed in a working mechanism. In such a configuration, deformation is caused by an acceleration applied to the working mechanism which, in a preferred embodiment, is formed of a semiconductor substrate material.

2. Discussion of the Related Art

Sensors are known for detecting acceleration, force and the like by obtaining variations in electrical resistance that resistance elements undergo when working mechanisms in the sensors are subjected to elastic deformation due to the action of acceleration, force or the like exerted on the working mechanisms. In such sensors, a thin-walled portion capable of elastic deformation is formed as the working mechanism on a semiconductor substrate in the form of a plate of single crystal silicon. The resistance elements are also formed in the working mechanism.

FIG. 8 is a plan view of a conventional acceleration sensor having a circular diaphragm portion. FIG. 9 is a sectional view of the sensor shown in FIG. 8.

In FIGS. 8 and 9, an acceleration sensor 50 has a working mechanism 52 in the form of a plate of single crystal silicon as well as a pedestal 51. The working mechanism 52 has a thin-walled diaphragm 52D in its center. A weight portion 53 is coupled to the center of the diaphragm 52D and, upon undergoing acceleration, is displaced vertically and bilaterally in relation to the view shown in FIG. 9. With the displacement of the weight portion 53, the thin-walled diaphragm 52D is also displaced vertically and bilaterally. Resistance elements provided for the diaphragm 52D detect the displacement in terms of variations in electrical resistance, whereby acceleration is detected.

The diaphragm portion is often designed so that its outer periphery is made circular. This is intended not only to attain highly sensitive properties, but also to secure reliability and mechanical strength of the sensor of the sort described above.

Although the thin-walled diaphragm portion is formed by etching from a plate of single crystal silicon, various techniques have been devised to implement circular etching because the etching rate differs according to the crystalline orientation of the plate of single crystal silicon.

For example, the thickness of the diaphragm portion has been regulated by first applying isotropic etching and then skillfully combining anisotropic etching and an etch stop technique. Therefore, the method of forming the diaphragm portion tends to become complicated and the problem is that such a method makes it difficult to improve the yield and tends to increase processing time. In other words, the conventional method requires increased levels of skill on the part of the worker.

Consequently, one technique has been introduced in which the diaphragm portion is formed by anisotropic etching only. FIG. 10 is a plan view of a working mechanism 60 of an acceleration sensor having a square diaphragm portion 62 and a pedestal 61 which is positioned in the lower part thereof.

Another technique that has been proposed is to subject the (110) crystal face of a plate of single crystal silicon to anisotropic etching using an octagonal mask pattern.

FIG. 11 is a diagram illustrating stress distribution in the acceleration sensor of FIG. 10 based on the finite element method. Analysis under the finite element method (FEM analysis) is one of the simulation techniques used for analyzing structural properties, such as stress distribution, in each part in accordance with the solution of convergence obtained through numerical analysis, such as successive calculation and the like, by dividing an object to be examined into extremely small elements, creating mathematical models element by element, and assigning each model a space-temporal boundary condition together with an initial condition.

FIG. 11 shows the results of calculation of the distribution of stresses applied to the square diaphragm portion 62 of FIG. 10 formed with a wafer of single crystal silicon.

As shown in FIG. 11, when acceleration is exerted in the direction of G, stresses concentrate on parts perpendicular to the direction G out of the outer periphery of the diaphragm portion 62 and appear as stresses st1, st2. Other stresses concentrate on parts perpendicular thereto out of the periphery of the central square of the diaphragm portion 62 and appear as stresses st3, st4.

FIG. 12 is a plan view illustrative of the structure of the working mechanism 70 of an acceleration sensor prepared by employing the aforementioned technique. As shown in FIG. 12, an octagonal diaphragm portion 72 is formed on the working mechanism 70 in the form of a plate of single crystal silicon having a rectangular plane.

In an attempt to implement the aforementioned techniques of producing acceleration sensors and, more specifically, where such a working mechanism has the square diaphragm portion 62 of FIG. 10, for example, it is essential to make the area of the square diaphragm portion 62 equal to or greater than that of the aforementioned circular diaphragm portion (52D of FIG. 8) in order to secure sensitivity equal to that which is available from the circular diaphragm portion. Therefore, the area of the square diaphragm portion 62 is maximized to the extent possible within the working mechanism of limited dimensions. However, this can result in connection failures as the pedestal-to-diaphragm coupling area decreases.

On the other hand, an anisotropic etching interface S71 in the working mechanism 70 having the octagonal diaphragm portion 72 of FIG. 12 forms an angle θ2 as small as approximately 35° as shown in FIG. 13; this is also the case with the interface S73. Therefore, the dimensions of the working mechanism 70 have to be reduced to secure the pedestal-to-diaphragm coupling area. Actually, the top of a working mechanism measuring 8 mm by 6.8 mm respectively representing the horizontal length L2 and the vertical length L3 as shown in FIG. 12 is not reducible. This is disadvantageous and still poses a problem in that the L2 and L3 constitute an obstacle to reducing the size of the acceleration sensor. Moreover, the number of acceleration sensors to be cut out of a wafer tends to decrease and the disadvantage again is that such acceleration sensors become costly.

SUMMARY OF THE INVENTION

Accordingly, the present invention is directed to an acceleration sensor and method for producing the same which substantially obviate one or more problems due to limitations and disadvantages of the related art.

An object of the present invention is to solve and overcome the foregoing problems and disadvantages by providing a small-sized, reliable, low-cost acceleration sensor including a working mechanism having a large joint surface.

Another object of the present invention is to provide a method for simply and easily producing an acceleration sensor.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an acceleration sensor comprises a working mechanism including a square plate of single crystal silicon, the working mechanism having a thin-walled diaphragm portion at a central portion of the working mechanism, and an edge portion of the working mechanism forming a joint surface of a square frame; a weight portion disposed at a center of the diaphragm portion; and a plurality of resistance elements, each of the resistance elements being one of incorporated in the diaphragm portion and fastened onto a surface of the diaphragm portion, and each of the resistance elements having a resistance which varies in response to telescopic displacement of the diaphragm portion when acceleration and force are applied to the working mechanism such that acceleration and force are detected according to variations in the resistance values of the resistance elements; wherein the diaphragm portion is formed on a (100) face of the plate of single crystal silicon and multiple corner portions on the joint surface of the square frame comprise expanded portions directed in a center direction of the plate of single crystal silicon.

In another aspect, a method of producing an acceleration sensor comprises the steps of: covering a (100) face of a square plate of single crystal silicon with a mask having at least an octagonal opening; and subjecting the plate of single crystal silicon to anisotropic etching so as to form an expanded portion in each of four corner portions of the plate of single crystal silicon, the expanded portions being directed in a center direction of the plate of single crystal silicon.

Under the method for producing the acceleration sensor according to the present invention, the coupling of the square diaphragm portion to a pedestal is strengthened by the expanded portions on the joint surface formed in the four corner portions of the outer periphery of the diaphragm portion. Consequently, any defective joint occurring during processing is eliminated and the processability is improved to ensure mass-producibility with a high yield at low cost. Further, a long life and stable operation can be achieved for sensors in use.

Under the method of producing the acceleration sensor according to the present invention, moreover, the (100) face of the plate of single crystal silicon is covered with the mask having the octagonal opening before being subjected to anisotropic etching. Consequently, the expanded portions directed in the center direction are readily formed in the respective four corner portions of the plate of single crystal silicon, whereby the manufacture of the acceleration sensor thus structured is readily accomplished.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention. In the drawings.

DETAILED DESCRIPTION OF PREPARED EMBODIMENT(S)

Reference will now be made in detail to the preferred embodiments of the present invention, examples of which are illustrated in the accompanying drawings.

Figure 1:
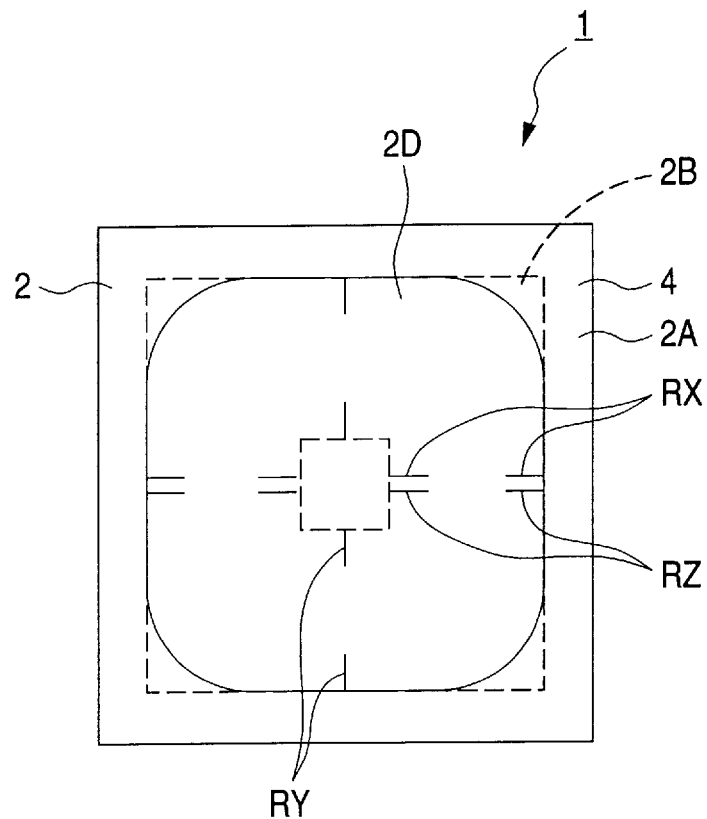
FIG. 1 is a plan view showing the structure of an acceleration sensor according to the present invention.
Figure 2:
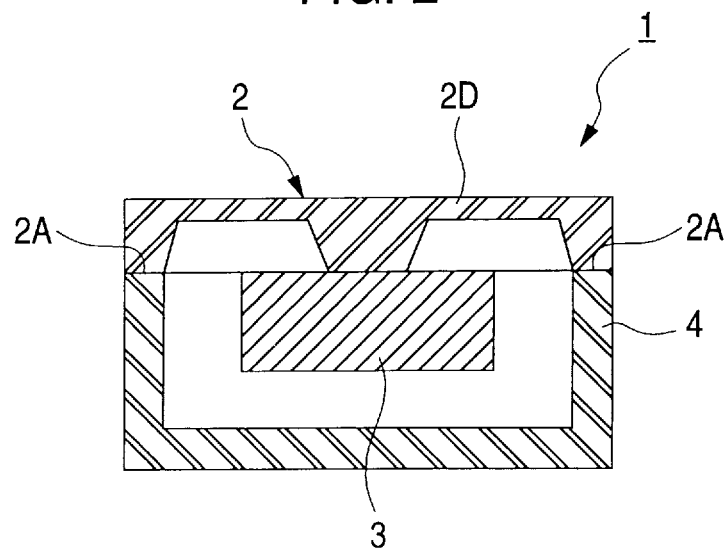
FIG. 2 is a sectional view of the acceleration sensor of FIG. 1.

FIG. 1 is a plan view showing the structure of an acceleration sensor according to the present invention. FIG. 2 is a sectional view of the acceleration sensor of FIG. 1.

As shown in FIGS. 1 and 2, an acceleration sensor 1 comprises a square plate-like working mechanism 2 made of a semiconductor pellet cut out of a wafer of single crystal silicon; a frame 4 which is a square and substantially similar in dimension to the working mechanism 2 and which has a recess in its central portion and holds the working mechanism 2 via a joint surface 2A with its four-sided frame; and a weight portion 3.

The working mechanism 2 is provided with a thin-walled flexible diaphragm portion 2D having an outer periphery whose four corners of the square are folded inwardly. The diaphragm portion 2D is formed on the face (100) of the plate of single crystal silicon.

The weight portion 3 is coupled to the central portion of the diaphragm portion 2D in a suspended condition. An area outside the outer periphery (the linear portion of FIG. 1) of the diaphragm portion 2D forms the joint surface 2A, the linear portion being in parallel to the edge of the working mechanism 2, and expanded portions 2B are each formed in areas outside the respective four corners of the outer periphery thereof.

Both the joint surface 2A and the expanded portions 2B are coupled to the frame 4 and, especially because the expanded portions 2B are coupled to the frame 4, the working mechanism 2 is rigidly and securely supported by the frame 4.

In the diaphragm portion 2D are four resistance elements RX, four resistance elements RY and four resistance elements RZ, which are formed in the respective predetermined directions. The resistance value of each resistance element varies with the displacement of and the stress applied to the diaphragm portion 2D. Thus, the resistance values of the resistance elements vary according to the deformation of the diaphragm portion 2D. Acceleration and force are then detected by detecting variations in the resistance values of these 12 resistance elements RX, RY, RZ.

The resistance elements RX, RY, RZ are directly incorporated in the diaphragm portion 2D or otherwise provided on the surface of the diaphragm portion 2D by joining their separate bodies onto the surface of the diaphragm portion.

In operation, while the weight portion 3 is in such a state that it is displaceable in the recess of the frame 4, external force acts on the weight portion 3 when acceleration and vibration are applied thereto, whereby the weight portion 3 is vertically and bilaterally displaced accordingly.

The displacement of the weight portion 3 is transmitted to the diaphragm portion 2D and the mechanical deformation of the diaphragm portion 2D occurs. Therefore, the electrical resistance of the resistance elements RX, RY, RZ is caused to vary and the variations therein can be sensed or measured outside.

Although greater force acts on the diaphragm portion 2D in the course of application of such acceleration and vibration, since the expanded portions 2B in addition to the joint surface 2A have been coupled to the frame 4 as described above, and since the working mechanism 2 is rigidly and securely supported by the frame 4 due to the expanded portions 2B coupled to the frame 4, the working mechanism 2 having the diaphragm portion is prevented from peeling off the frame 4.

Figure 3:
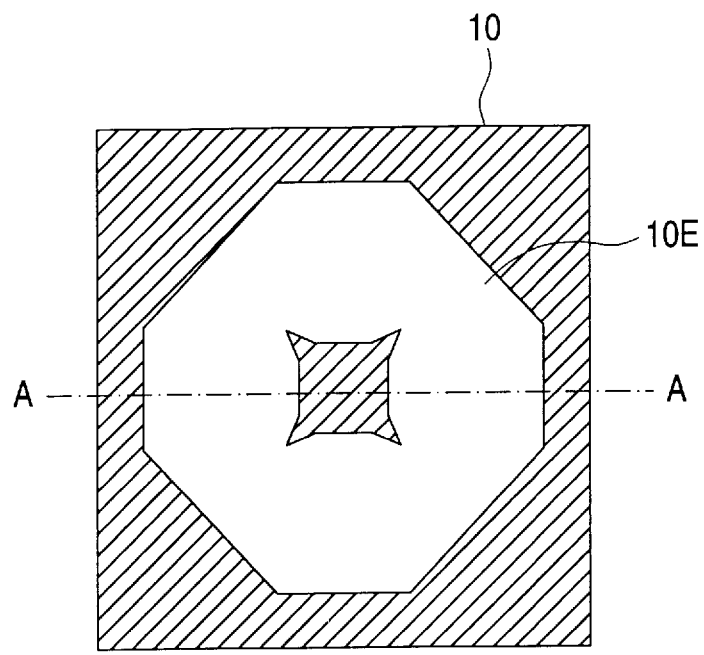
FIG. 3 is a plan view of an etching mask for use in the process of producing an acceleration sensor according to the present invention.
Figure 4:
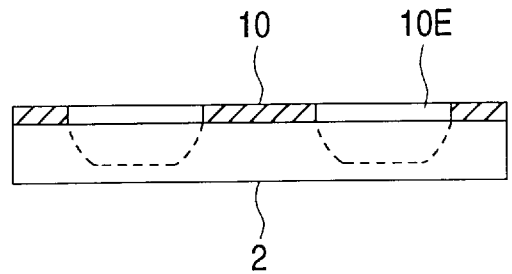
FIG. 4 is a sectional view illustrative of an etching process using the etching mask of FIG. 3.

FIG. 3 is a plan view of an etching mask for use in the process of producing an acceleration sensor according to the present invention. FIG. 4 is a sectional view illustrative of an etching process using the etching mask of FIG. 3.

The following description is for a method for producing the acceleration sensor according to the present invention by reference to both FIGS. 3 and 4. During the step of forming a diaphragm portion by etching from a square plate of single crystal silicon, a (100) crystal face is, as shown in FIGS. 3 and 4, covered with a mask 10 having an octagonal opening 10E so as to apply only anisotropic etching to the (100) face of the plate of single crystal silicon. Then, the portions 2B directed in the center direction are formed in the four corner portions of the plate of single crystal silicon by anisotropic etching using the (100) crystal face and the mask 10 (see FIG. 1).

Figure 5:
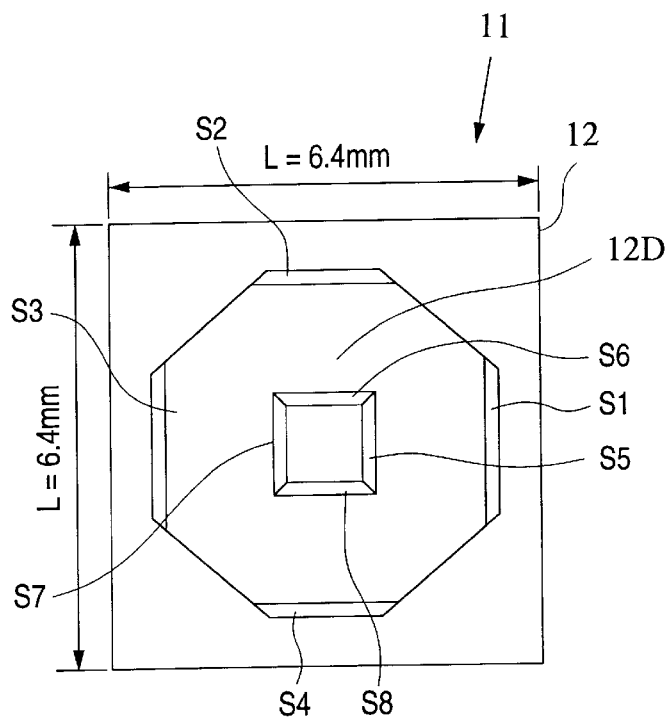
FIG. 5 is a plan view illustrative of the structure of an acceleration sensor manufactured using a method of manufacture according to the present invention.

FIG. 5 is a plan view illustrative of the structure of the working mechanism 12 of an acceleration sensor 11 which is produced on the (100) crystal face of the plate of single crystal silicon by anisotropic etching with an octagonal mask pattern. In FIG. 5, an octagonal diaphragm portion is formed on the working mechanism 12 of the square plate of single crystal silicon.

Figure 6:
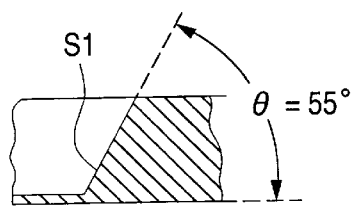
FIG. 6 is a sectional view showing an angular configuration of a tilted portion of FIG. 5.

FIG. 6 is a sectional view showing an angular configuration of the interface of FIG. 5.

Figure 12:
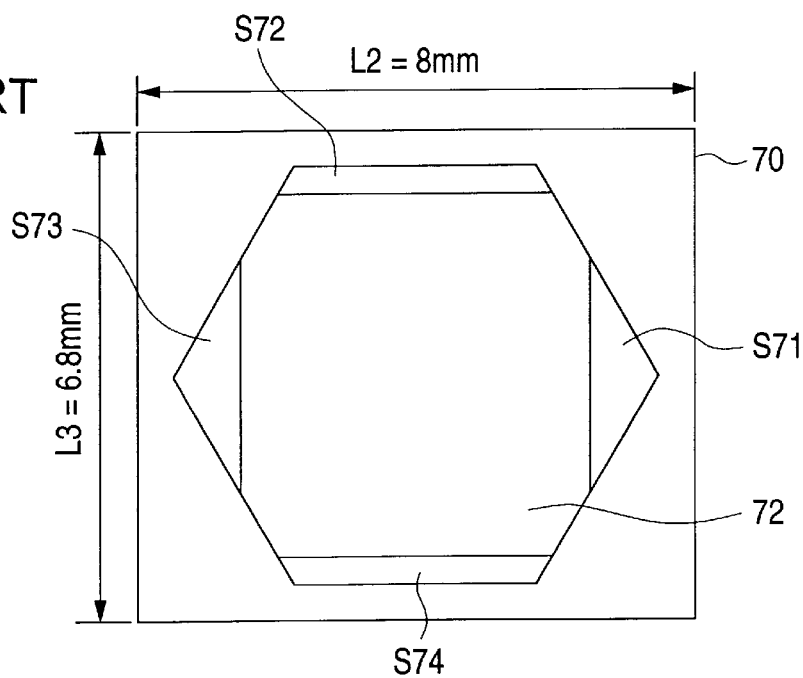
FIG. 12 is a plan view illustrative of the structure of an acceleration sensor manufactured by a conventional method.
Figure 13:
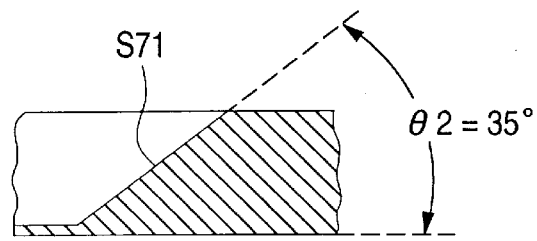
FIG. 13 is a sectional view showing an angular configuration of a tilted portion of FIG. 12.

In the case of the working mechanism 12 having the octagonal diaphragm portion in FIG. 5, an anisotropic etching interface S1 as shown in FIG. 6 forms an angle θ as large as approximately 55°; this is also the case with other interfaces S2–S8. The working mechanism consequently becomes reducible in size to about 75% of the prior art example shown in FIG. 12, whereby the size of such an acceleration sensor can be reduced with the added effect of attaining lower cost.

Figure 7:
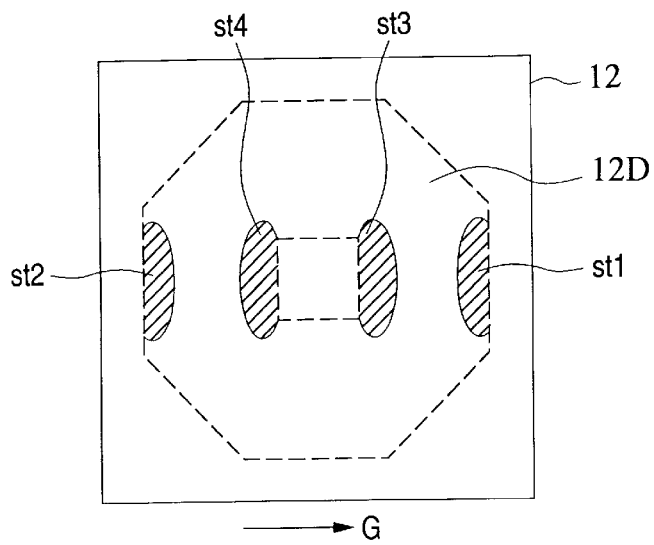
FIG. 7 is a diagram illustrative of stress distribution in the acceleration sensor under the finite element method according to the present invention.
Figure 8:
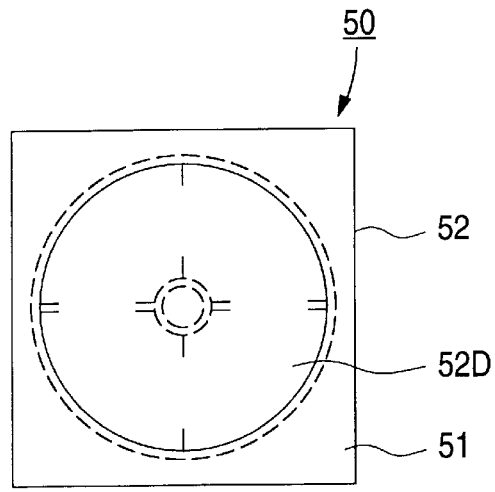
FIG. 8 is a plan view of a conventional acceleration sensor having a circular diaphragm portion.
Figure 9:
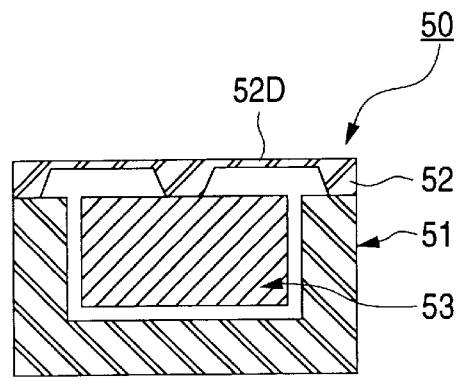
FIG. 9 is a sectional view of the acceleration sensor of FIG. 8.
Figure 10:
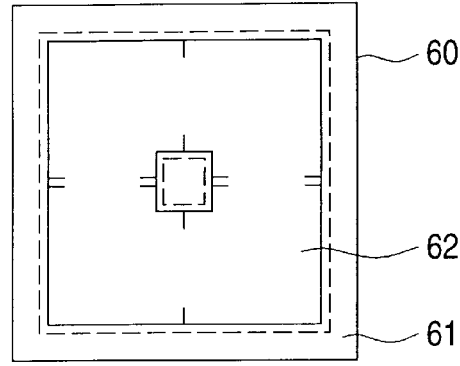
FIG. 10 is a plan view of a conventional acceleration sensor having a square diaphragm portion.
Figure 11:
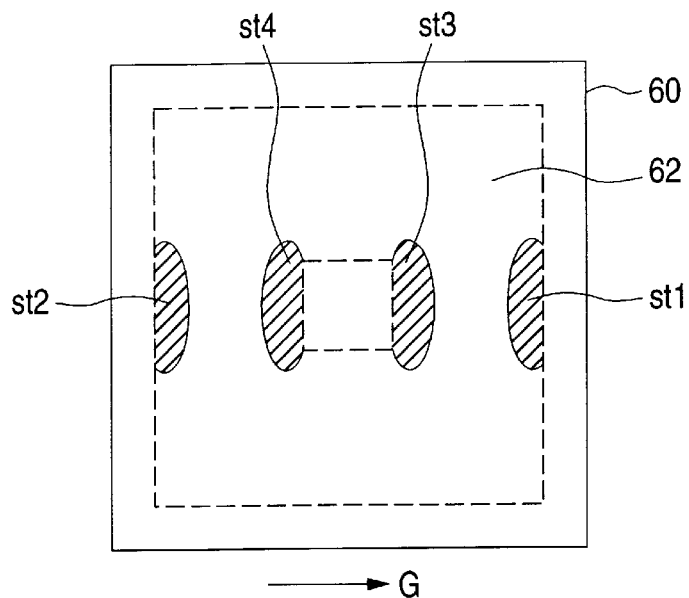
FIG. 11 is a diagram illustrating stress distribution in the acceleration sensor of FIG. 10 based on the finite element method.

FIG. 7 is a diagram illustrative of stress distribution in the acceleration sensor under the finite element method according to the present invention. The distribution of stresses applied to an octagonal diaphragm portion 12D formed of the wafer of single crystal silicon shown in FIG. 5 is calculated by analysis under the finite element method, the result of which is shown in FIG. 7.

As shown in FIG. 7, when acceleration is exerted in the direction of G, the stresses concentrate on parts perpendicular to the direction G out of the outer periphery of the diaphragm portion 12D and appear as stresses st1, st2. The stresses concentrate on parts perpendicular thereto out of the periphery of the central square of the diaphragm portion 12D and appear as stresses st3, st4. This is also the case where the stress is generated when the acceleration is applied in a direction perpendicular to the direction G.

As is clear from the result of the numerical value analysis above, the formation of the expanded portions of the joint surface in the four corner portions of the outer periphery of the square diaphragm portion according to the present invention is intended to achieve the effect of securing a rigid junction without affecting the sensitivity of the acceleration sensor, which effect has been proved by the simulation technique. Moreover, the results of characteristic tests using actual products have been shown to be similar to the results of the simulation mentioned above.

As set forth above, the expanded portions on the joint surface are formed in the respective four corner portions of the outer periphery of the square diaphragm portion in the acceleration sensor according to the present invention, so that the coupling of the diaphragm portion to the pedestal is strengthened. Further, any defective joint occurring during the processing is eliminated and the yield is improved to allow mass-producibility with efficiency. Further, a long life and stable operation of the sensor in use make achievable the effect of securing reliability.

Under the method of producing the acceleration sensor according to the present invention, moreover, the (100) face of the plate of single crystal silicon is covered with the mask having the octagonal opening before being subjected to anisotropic etching. Consequently, the expanded portions directed in the center direction are readily formed in the respective four corner portions of the plate of single crystal silicon with the effect of readily accomplishing the manufacture of the acceleration sensor as described above.

It will be apparent to those skilled in the art that various modifications and variations can be made in the acceleration sensor of the present invention without departing from the spirit or scope of the invention. Thus, it is intended that the present invention cover the modifications and variations of this invention provided they come within the scope of the appended claims and their equivalents.

What is claimed is:

1. An acceleration sensor, comprising:
   a working mechanism including a single silicon crystal, the working mechanism having a thin-walled diaphragm portion at a central portion of the working mechanism, and an interface portion of the working mechanism forming a joint surface of a square frame;

a weight portion disposed at a center of the diaphragm portion; and a plurality of resistance elements, each of the resistance elements being either incorporated in the diaphragm portion or fastened onto a surface of the diaphragm portion, and each of the resistance elements having a resistance which varies in response to displacement of the diaphragm portion when the force of acceleration is applied to the working mechanism such that the force of acceleration is detected according to variations in the resistance values of the resistance elements;

wherein the diaphragm portion is formed on a (100) face of the single silicon crystal and multiple corner portions on the joint surface of the interface portion comprise expanded portions directed in a center direction of the working mechanism and wherein the angle of surfaces of the interface portion between the expanded portions is approximately 55° with respect to the diaphragm portion.

2. An acceleration sensor according to claim 1, wherein the multiple corner portions comprise at least four corner portions.

3. An acceleration sensor, comprising:

a working mechanism including a single silicon crystal, the working mechanism including an interface portion and a diaphragm portion;

a frame for holding the working mechanism within a recess portion formed in the frame, the recess portion having substantially linear portions, and the working mechanism being held by the frame at joint surfaces located between the interface portion and the linear portions of the recess portion;

a weight portion disposed at a center of the diaphragm portion; and a plurality of resistance elements coupled to the diaphragm portion, wherein the diaphragm portion is formed on a (100) face of the single silicon crystal and multiple corner portions on the joint surface of the interface portion comprise expanded portions directed in a center direction of the working mechanism and wherein the angle of surfaces of the interface portion between the expanded portions is approximately 55° with respect to the diaphragm portion.

4. An acceleration sensor according to claim 3, wherein the plate single crystal silicon is square.

5. An acceleration sensor according to claim 3, wherein the diaphragm portion comprises a thin-walled diaphragm located at a central portion of the working mechanism.

6. An acceleration sensor according to claim 3, where the working mechanism has a substantially square shape.

7. An accelerator sensor according to claim 6, wherein the recess portion of the frame has a substantially square shape substantially corresponding to the shape of the working mechanism.

8. An acceleration sensor according to claim 3, wherein the resistance elements each have a resistance value which varies in response to displacement of the diaphragm portion, the resistance values representing the force of acceleration.

9. An acceleration sensor according to claim 3, wherein the diaphragm portion is formed on a (100) face of a plate of single crystal silicon.

* * * * *

UNITED STATES PATENT AND TRADEMARK OFFICE
CERTIFICATE OF CORRECTION

PATENT NO. : 5,866,817
DATED : February 2, 1999
INVENTOR(S) : Masatomo MORI et al.

It is certified that error appears in the above-identified patent and that said Letters Patent is hereby corrected as shown below:

Column 8, line 16, delete "plate".

Signed and Sealed this

Thirteenth Day of July, 1999

Attest:

Q. TODD DICKINSON

Attesting Officer

Acting Commissioner of Patents and Trademarks